United States Patent
Wittenschlaeger (10) Patent No.: US 12,251,976 B2
(45) Date of Patent: Mar. 18, 2025

(54) SYSTEM FOR MINIMIZING DATA TRANSMISSION LATENCY BETWEEN A SENSOR AND A SUSPENSION CONTROLLER OF A VEHICLE

(71) Applicant: Fox Factory, Inc., Duluth, GA (US)

(72) Inventor: Thomas Wittenschlaeger, El Cajon, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/982,498

(22) Filed: Nov. 7, 2022

(65) Prior Publication Data

US 2023/0173868 A1 Jun. 8, 2023

Related U.S. Application Data

(62) Division of application No. 15/588,421, filed on May 5, 2017, now Pat. No. 11,491,841.

(51) Int. Cl.
*B60G 17/00* (2006.01)
*B60G 17/06* (2006.01)
*H04L 12/40* (2006.01)

(52) U.S. Cl.
CPC .......... *B60G 17/06* (2013.01); *B60G 2400/20* (2013.01); *B60G 2400/40* (2013.01); *B60G 2400/84* (2013.01); *B60G 2401/16* (2013.01); *B60G 2500/10* (2013.01); *B60G 2600/21* (2013.01); *B60G 2600/70* (2013.01); *H04L 12/40* (2013.01); *H04L 2012/40215* (2013.01)

(58) Field of Classification Search
CPC .......... B60G 2400/20; B60G 2400/40; B60G 2400/84; B60G 2401/16; B60G 2500/10; B60G 2600/21; B60G 2600/70; H04L 12/40; H04L 2012/40215
See application file for complete search history.

(56) References Cited

U.S. PATENT DOCUMENTS

| | | |
|---|---|---|
| 5,497,324 A | 3/1996 | Henry et al. |
| 5,510,989 A | 4/1996 | Zabler et al. |
| 5,524,213 A | 6/1996 | Dais et al. |
| 5,535,380 A | 7/1996 | Bergkvist et al. |
| 6,161,844 A | 12/2000 | Charaudeau et al. |
| 6,296,091 B1 | 10/2001 | Hamilton |
| 6,502,837 B1 | 1/2003 | Hamilton et al. |
| 6,519,517 B1 | 2/2003 | Longman et al. |
| 6,732,033 B2 | 5/2004 | Laplante et al. |
| 6,904,344 B2 | 6/2005 | Laplante et al. |
| 6,964,325 B2 | 11/2005 | Maes |
| 7,076,351 B2 | 7/2006 | Hamilton et al. |
| 7,483,775 B2 | 1/2009 | Karaba et al. |

(Continued)

*Primary Examiner* — Truc M Do (57) ABSTRACT

A system for minimizing data transmission latency between a sensor and a suspension controller of a vehicle is described. The system includes: a state determination module that determines a physical state of the vehicle; a plurality of data paths for transmitting a first signal from the sensor to the suspension controller; a data path configurator of the controller that selects a first data path of the plurality of data paths based on at least one characteristic of the first data path and the physical state and configures the first data path to transmit the first signal; and an actuation module that generates an actuation signal to control a damping characteristic of the suspension actuator based on at least the first signal.

10 Claims, 8 Drawing Sheets

(56) References Cited

U.S. PATENT DOCUMENTS

| | | |
|---|---|---|
| 7,548,545 B1 | 6/2009 | Wittenschlaeger et al. |
| 7,706,942 B2 | 4/2010 | Miyajima |
| 7,966,113 B2 | 6/2011 | Kroehnert et al. |
| 8,296,465 B2 | 10/2012 | Wittenschlaeger |
| 8,364,744 B2 | 1/2013 | Wittenschlaeger et al. |
| 8,374,748 B2 | 2/2013 | Jolly |
| 8,504,864 B2 | 8/2013 | Menon et al. |
| 8,626,415 B2 | 1/2014 | Geyer et al. |
| 8,666,596 B2 | 3/2014 | Arenz |
| 8,862,706 B2 | 10/2014 | Wittenschlaeger |
| 8,966,889 B2 | 3/2015 | Six |
| 9,174,508 B2 | 11/2015 | Neil et al. |
| 9,363,204 B2 | 6/2016 | Wittenschlaeger |
| 2005/0017462 A1 | 1/2005 | Kroppe |
| 2007/0021886 A1 | 1/2007 | Miyajima |
| 2012/0140861 A1 | 6/2012 | Menon et al. |
| 2013/0094498 A1 | 4/2013 | Wittenschlaeger et al. |
| 2013/0144489 A1* | 6/2013 | Galasso ............... B60G 17/015 701/37 |
| 2014/0297117 A1 | 10/2014 | Near et al. |
| 2015/0092661 A1 | 4/2015 | Huang et al. |
| 2015/0200809 A1 | 7/2015 | Wittenschlaeger |
| 2015/0224845 A1* | 8/2015 | Anderson ............ B60G 17/019 701/37 |
| 2016/0103162 A1* | 4/2016 | Safa-Bakhsh ........ G01R 21/133 702/62 |
| 2016/0265615 A1 | 9/2016 | Marking |
| 2017/0137023 A1 | 5/2017 | Anderson et al. |
| 2017/0267049 A1 | 9/2017 | Kubota et al. |

\* cited by examiner

SYSTEM FOR MINIMIZING DATA TRANSMISSION LATENCY BETWEEN A SENSOR AND A SUSPENSION CONTROLLER OF A VEHICLE

CROSS-REFERENCE TO RELATED APPLICATIONS

This application is a Divisional and claims priority to and benefit of co-pending U.S. patent application Ser. No. 15/588,421, filed on May 5, 2017, entitled "SYSTEM FOR MINIMIZING DATA TRANSMISSION LATENCY BETWEEN A SENSOR AND A SUSPENSION CONTROLLER OF A VEHICLE" by Thomas Wittenschlaeger., and assigned to the assignee of the present application, the disclosure of which is hereby incorporated by reference in its entirety.

FIELD OF THE INVENTION

Embodiments of the present technology relate generally to suspension and damping control systems.

BACKGROUND

Traditional suspension such as shock absorbers, springs, and the like embody damping characteristics that are "tuned" prior to operation. For example, a street vehicle will have a suspension tuned for a pleasant ride, while a paved-track racing vehicle will have a much firmer suspension to hold the road during high g-force cornering, and an offroad vehicle would have a more absorptive suspension to allow the vehicle to go over rough roads, potholes, bumps, whoops, jumps, gravel, sand, water, and the like while absorbing many of the jolts. Of course, there are a number of deleterious effects if a suspension tuned for one environment is used in another. These effects can span the gap from an uncomfortable ride (e.g., to stiff or to bouncy) to significantly dangerous loss of control events (e.g., hard suspension on rough road, soft suspension on the track, etc.).

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

Current suspension control systems suffer from latency issues when sensing, computing, and sending actuation signals for damper and spring control. High piston shaft speed and accelerations require faster reaction times from vehicle networks, processing architectures, and software algorithms than are presently provided.

Some solutions rely on a controller area network (CAN) bus to transmit actuation signals from a central ECU to each corner of the vehicle. The actuators on the shock absorbers are controlled by vehicle-specific control measures that compensate for vehicle heave, pitch, and roll. However, many of these systems fail to address the rapid changes in speed and direction at each corner of the vehicle. The problem is further exacerbated by off-road situations where road conditions are more severe and vary far more significantly than traditional on-road situations.

Embodiments described herein, address and overcome the shortcomings by utilizing shared and co-processing of data, co-location of subroutines to co-occurrence, corner-specific scheduling of apps, mirroring data, and load balancing. In addition, further aspects of enhancing the data pathways, throughput and latency include utilizing data shunting, sensor pruning, and statistical minimization. Moreover, embodiments described herein provide a data path configuration control that is capable of reserving higher speed data paths, memory, and cache to further minimize latency.

For example, embodiments provide separate processing, network, and memory for a plurality of controlled damping element while maintaining a data network to ensure that all elements are thinking and acting as one. The system utilizes available sensors as needed to provide wheel-specific, e.g., corner specific, and vehicle specific, e.g., platform specific, controls based on a hierarchy. The system will operate in various states for both platform and wheel-specific control.

Figure 1:
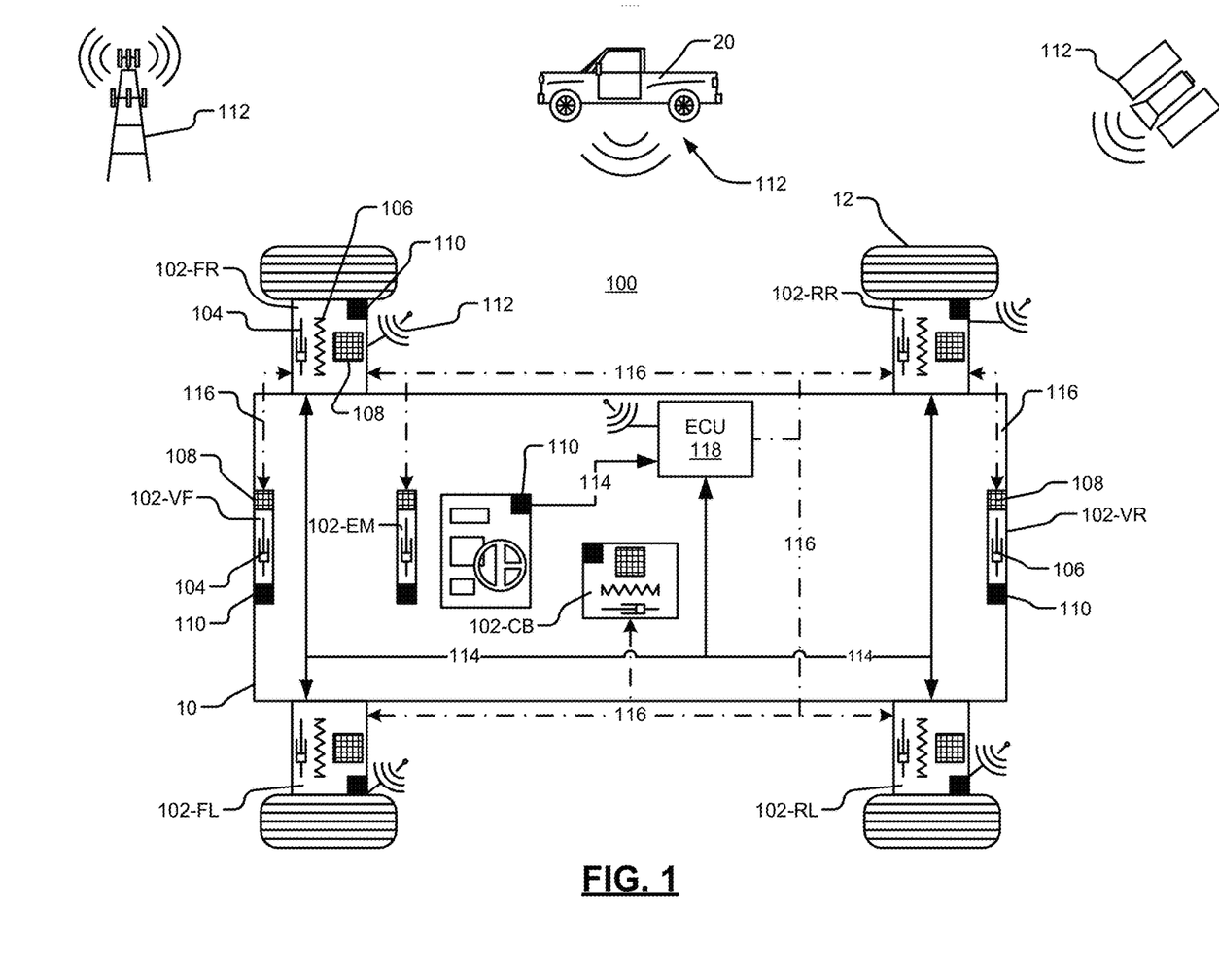
FIG. 1 is a block diagram of a vehicle having a sensor and a suspension modifier, in accordance with an embodiment.

Referring now to FIG. 1, a block diagram of a vehicle 10 having a system 100 for minimizing data transmission latency between a sensor and a suspension controller is shown in accordance with an embodiment. In one embodiment, the system 100 includes features for selection of processing elements and processing support elements for controlling a suspension actuator of vehicle 10. In one embodiment, the system 100 includes features for controlling suspension of the vehicle 10 including at least one suspension actuator for controlling motion of an unsprung mass relative to a chassis of the vehicle 10 utilizing a minimized data set.

In one embodiment, system 100 includes one or more controllable and actuatable suspension components which include suspension modifiers 102 (each designated as "102-suffix" indicating location/use/etc.). Some or all of the suspension modifiers 102 may include actuatable suspension components such as controllable dampers 104 and/or adjustable springs 106. Some or all of the suspension modifiers 102 include at least one processing element 108. Some or all of the suspension modifiers 102 include at least one sensor 110. Some or all of the suspension modifiers 102 include at least one of wireless or satellite communication 112, CAN communication 114, and network communication 116. Some or all of the suspension modifiers 102 include CAN communication 114 and/or network communication 116 with a central engine control unit 118.

Suspension modifiers 102 may include shock absorbers 102-FR, 102-FL, 102-RR, and 102-RL (front right, front left, rear right, and rear left of vehicle 10, respectively) disposed between the sprung mass of the vehicle 10 or vehicle chassis and unsprung masses 12 at each corner of the vehicle 10, such as wheels or other ground engaging members (for example, skids of a snowmobile, tracks, etc.) Suspension modifiers 102 may include body dampers 102-VF and 102-VR (vehicle front and vehicle rear, respectively) which may provide side-to-side or up-and-down damping effects to improve pitch, roll, and yaw. Suspension modifiers 102 may include an engine mount 102-EM (engine mount) for damping engine torque, harmonic frequency vibration, and other NVH (noise, vibration, harshness) control. Suspension modifiers 102 may include one or more cabin shock absorbers 102-CB (cabin) for damping a passenger compartment or seating component, such as for example, a driver seat, a cockpit, or the entire cabin.

Sensors 110 include at least one sensor that measures a variable related to controlling motion of the unsprung mass 12 relative to the chassis of vehicle 10, such as at controllable and actuatable suspension modifiers 102, and transmits a signal corresponding to the variable over at least one of the communications 112, 114, and 116 that link the plurality of processing elements 108.

In one embodiment, the communications include a plurality of data paths such as, but not limited to, at least one of a CAN bus, a transmission control protocol network (TCP) path, a fast active queue management TCP network path, a time-triggered protocol network path, a FlexRay network path, a distributed network path, a wireless network data path, peer-to-peer interconnects, satellite data paths, fabric network data paths, harmonized control planes, and a distributed computing bus. One or more other vehicles 20 may communicate over-the-air via the same wireless networks.

Some exemplary network and data path examples, incorporated by reference herein, include those disclosed in: "Harmonized Control Planes, Systems and Methods," U.S. Pat. No. 9,363,204; "Hybrid Transport—Application Network Fabric Apparatus," U.S. Pat. No. 8,862,706; "Software Application Striping," U.S. Pat. No. 8,364,744; "Distributed Computing Bus," U.S. Pat. No. 8,296,465; "Dynamic Packet Routing," U.S. Pat. Pub. No. 2013/0094498; "Software-Based Fabric Enablement," U.S. Pat. Pub. No. 2015/0200809; and "Disaggregated Network Management," U.S. Pat. No. 7,548,545.

In one embodiment, the plurality of processing elements 108 is selected from the group consisting of the suspension modifiers 102, the ECU 118, on-board video processing elements (not shown but including forward- and rearward-facing cameras, edge detection cameras and the like), sound/sonar processing elements, infotainment unit processing elements, and any other processing capabilities typically found in an automotive environment.

In one embodiment, sensors 110 are one or a combination of forward-looking cameras, rear-looking cameras, acoustic sensors, accelerometers, angle meters to measure pitch, roll, and/or yaw, thermometers, infrared sensors, potentiometers, switches, and the like which provide information about the vehicle 10 to include platform level and corner of vehicle level information. For example, sensor 110 will identify an upcoming bump, a present level of shock actuation or travel position, throttle pedal position, brake pedal position, passenger position or movement, cabin position, a turn of the steering wheel, the vehicle speed, the g-force in a turn, etc. Sensors 110 may be integral with the suspension modifiers 102.

In one embodiment, the platform level inputs are selected from the group of sensors comprising a steering position, a throttle position, a brake position, vehicle acceleration, a vehicle geospatial position, a vehicle pitch, a vehicle roll, a vehicle yaw, a vehicle location position coordinate, and the like. The corner of vehicle level input is selected from the group of sensors comprising a wheel angle, a wheel camber, a damper position, a damper temperature, a gas spring pressure, a spring stress, a road surface camera, a fluid cavitation, and the like.

Suspension modifiers 102 may include damping and spring elements 104 and 106, such as for, but not limited to wheels, steering, body, harmonics, engine mount, seating, and the like.

Figure 6:
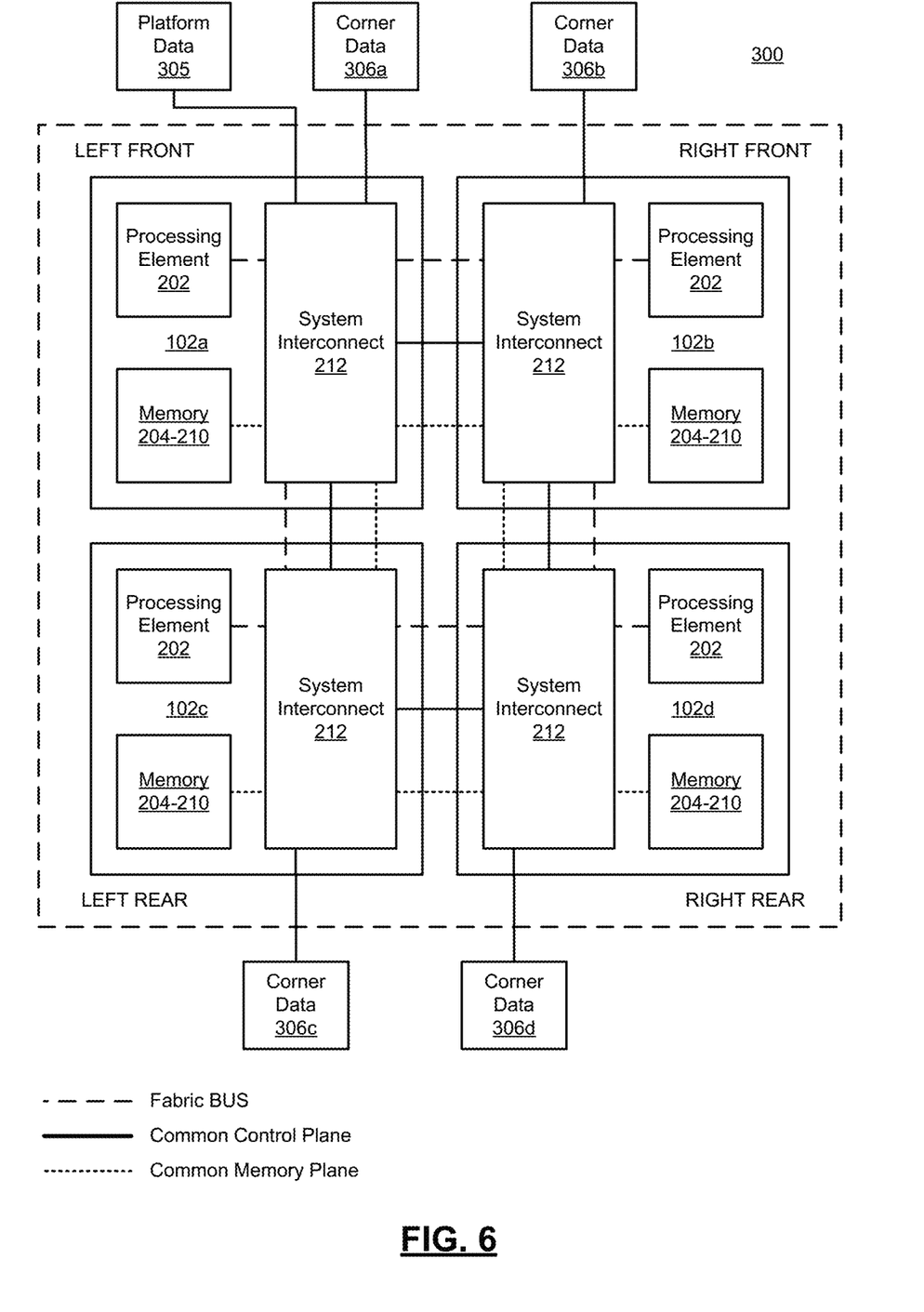
FIG. 6 is a block diagram of a plurality of communicatively coupled suspension modifiers, in accordance with an embodiment.

In one embodiment, the suspension modifiers 102 include common processing architecture and common memory architecture which may be physically dispersed but not functionally dispersed. The suspension modifiers 102 may have no intervening protocol (as shown in FIG. 6). The suspension modifiers 102 share a common backplane. In one embodiment, control of the various elements is platform-specific or corner-specific and any of the processing elements of suspension modifiers 102 can perform any of the control functions.

Figure 2:
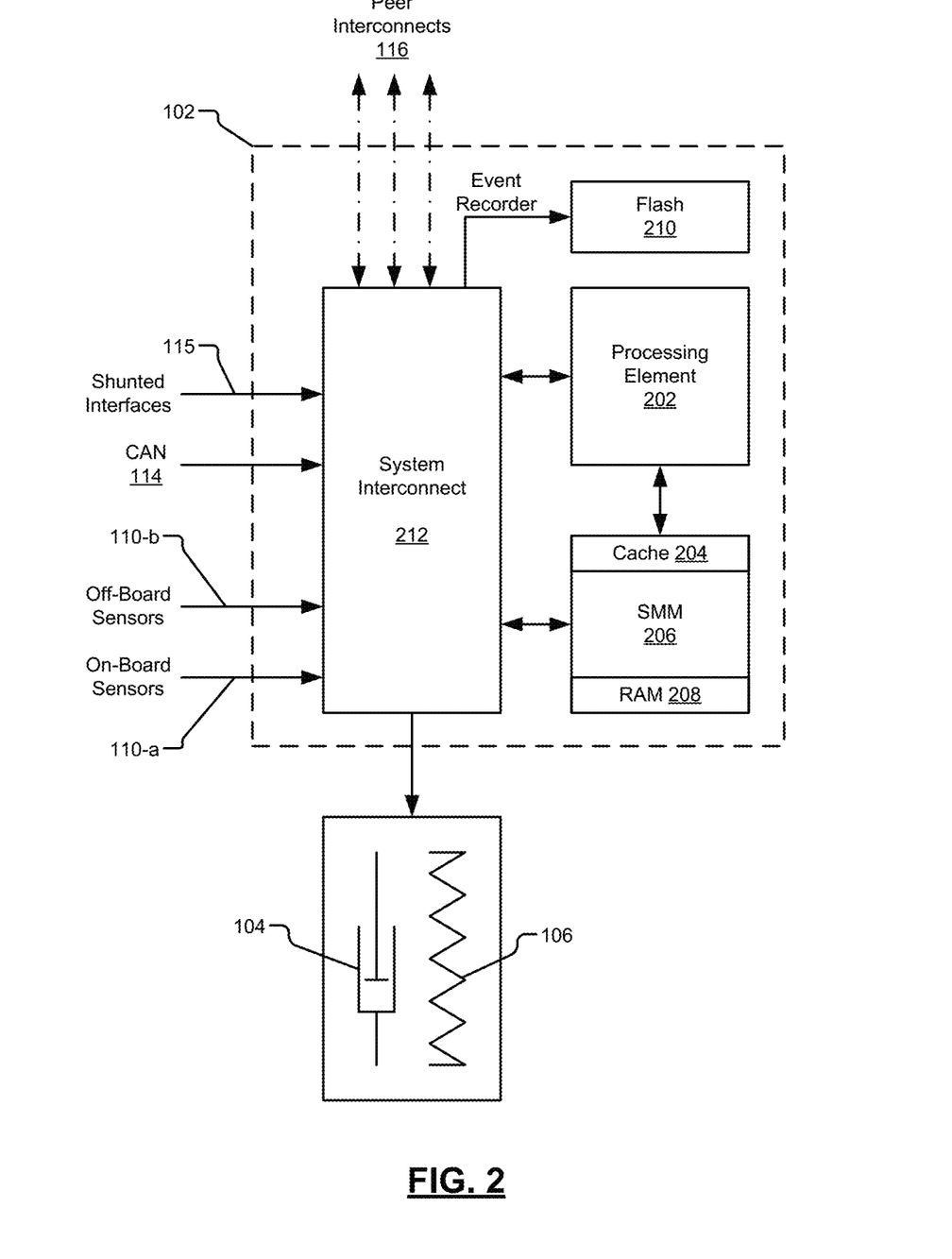
FIG. 2 is a block diagram of a suspension modifier, in accordance with an embodiment.

With reference now to FIG. 2, a block diagram 200 of a suspension modifier 102 is shown in accordance with an embodiment. For example, referring now to FIG. 2, an exemplary suspension modifier 102, such as suspension modifier 102-FR, may actuate damper 104 and/or spring 106 coupling an unsprung mass such as wheel 12 with a sprung mass of the vehicle 10 at the front-right (FR) corner. In one embodiment, suspension modifier 102 includes various computing components such as a processing element 202, cache 204, share/mirrored memory (SMM) 206, RAM 208, flash memory 210, and a system interconnect 212 for receiving and transmitting various signals. The computing components may be collocated on a system-on-a-chip (SOC) and may comprise an application specific integrated circuit (ASIC), a field programmable gate array (FPGA), or other circuitry including processing, memory, and communication features. In some examples, these and other computing components may be distributed among two or more suspension modifiers 102. The suspension modifier 102 includes executable software and may include other hardware and/or firmware that, together with processing element 202, cache 204, SMM 206, RAM 208, flash memory 210, and system interconnect 212, function as modules to execute strategies, computer code, and programming executables.

The system interconnect 212 may receive signals from sensors 110 via one or more of the available data paths. On-board sensors 110-a on the vehicle 10 and off-board sensors 110-b (such as sensors of another vehicle 20, sensors in a road, etc.) may transmit data signals to the suspension modifier 102 over one or more of the data paths which is then received at the system interconnect 212. Sensor signals may be transmitted over the CAN interface 114 from the ECU 118 or other connected controllers or modules such as a brake module, a stability control module, and the like. Driver inputs 14 such as brake position, accelerator position, clutch position, gear selector position may be provided to the system interconnect 212 over CAN 114 or another data path. Data may be provided to the system interconnect 212 over a shunted or dedicated interface 115 with the sensor 110 that may bypass one or more other modules. Each system interconnect 212 of each suspension modifier 102 may be connected with one or more other suspension modifiers by a peer interconnect 116.

Figure 3:
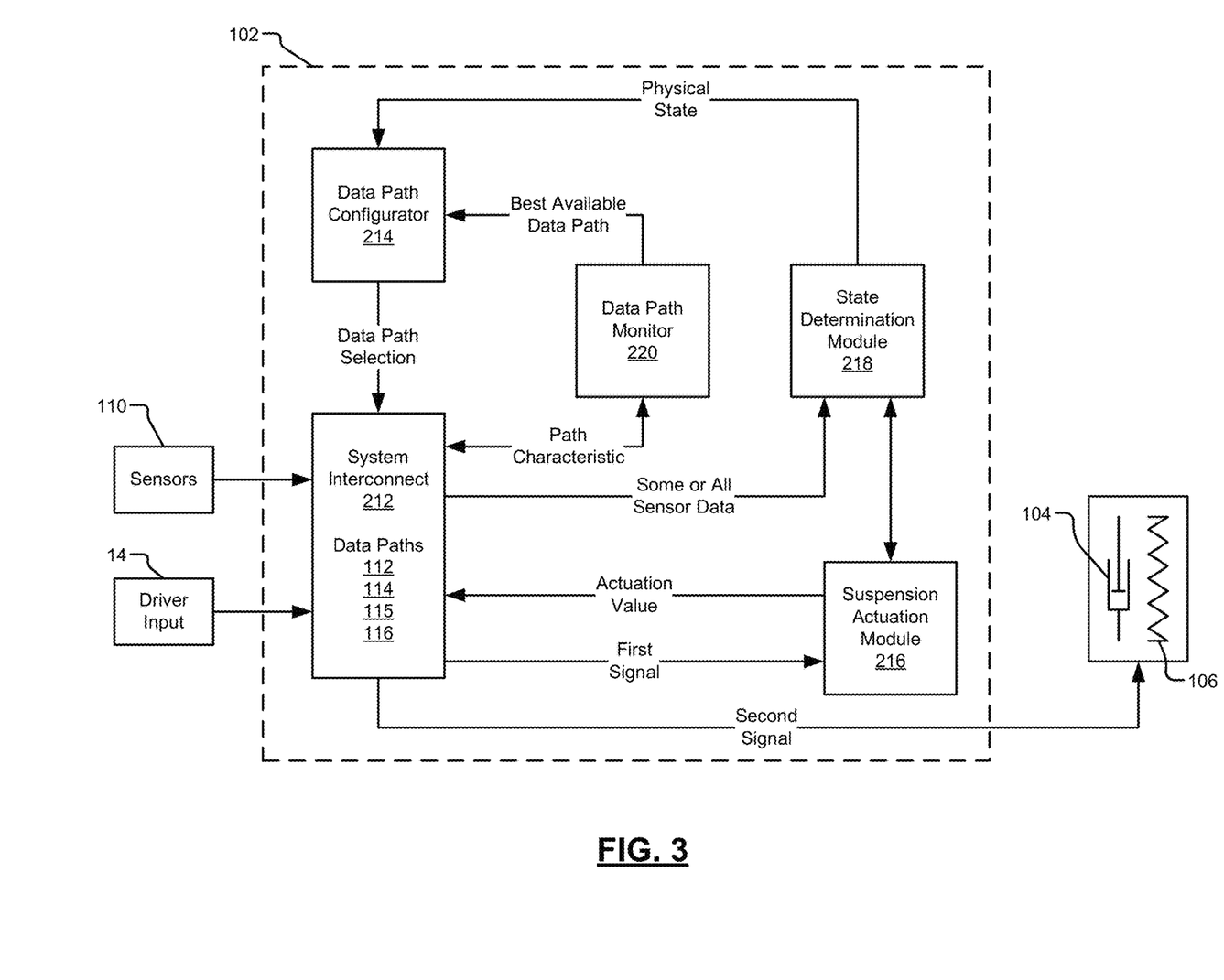
FIG. 3 is a block diagram of a suspension modifier, in accordance with an embodiment.

Referring now to FIG. 3, the system 100 via one or more suspension modifiers 102 comprises a plurality of data paths 112, 114, 115, 116 over which data from sensors 110 and driver inputs 14 are transmitted. One of the suspension modifiers 102 further comprises a data path configurator 214 that configures one of the plurality of data paths for transmitting a first signal from one of the sensors 110 to a suspension actuation module 216 (e.g., part of suspension modifier 102 or ECU 118). Data path configurator 214 further configures any or all of the plurality of data paths for transmitting a second signal from the suspension actuation module 216 to the damper 104 or spring 106. In one embodiment, the plurality of data paths includes, but is not limited to, at least one of a CAN bus, a transmission control protocol network (TCP) path, a fast active queue management TCP network path, a time-triggered protocol network path, a FlexRay network path, a distributed network path, a wireless network data path, or the like. Depending on the data need to generate an actuation value, the data path configurator 214 may configure multiple data paths from the plurality of data paths for transmitting additional signals.

In one embodiment, data path configurator 214 receives system information such as, but not limited to, a status or physical state of the vehicle 10 from a state determination module 218. For example, the state determination module 218 may receive some or all data from the sensors 110 and driver inputs 14 and determine a physical state of the vehicle based on data such as a GPS position, speed, geometry relative to the road surface, etc. As shown in FIGS. 1 and 3, data path configurator 214 shares information with and receives information from every other suspension modifier 102 via the peer data connection 116.

A data path monitor 220 may monitor one or more current path characteristics of the data paths. The data path monitor 220 may compare the current path characteristic to a characteristic minimum, maximum, or average value or a range of values and output a prioritization of available data paths for transmission of the first, second, and any other signals. A number methods may be used by data path configurator 214 when selecting a data path from the plurality of data paths. For example, the first data path for the first signal may be selected based on a physical distance of the data path, data path congestion, data path contention of the plurality of data paths, data path capacity, data path transmission rate, data path transmission protocol, and the like. In one embodiment, the first, second and $n^{th}$ data paths are selected based on one or more of a physical distance of the data path, data path congestion, data path contention, data path capacity, data path transmission rate, data path transmission protocol, and the like.

In one embodiment, the data path configurator 214 selects a first data path of the plurality of data paths based on at least one characteristic of the first data path and the physical state and configures the first data path to transmit the first signal and/or the second signal.

In one embodiment, after ECU 118 develops a suspension modification based on the resultant force and frequency vectors, data path configurator 214 selects the first data path and transmits the first signal from the suspension actuation module 216 which provides the suspension modification (e.g., an actuator command or signal) to at least one of the plurality of suspension components 104 and 106 to modify a performance of at least one of the plurality of suspension components. For example, in one embodiment the actuation module portion of suspension modifier 102 generates an actuation signal to control a damping characteristic of the suspension actuator based on at least the first signal. In one embodiment, the actuation module portion of suspension modifier 102 further sends the actuation signal to the suspension actuator.

Figure 4:
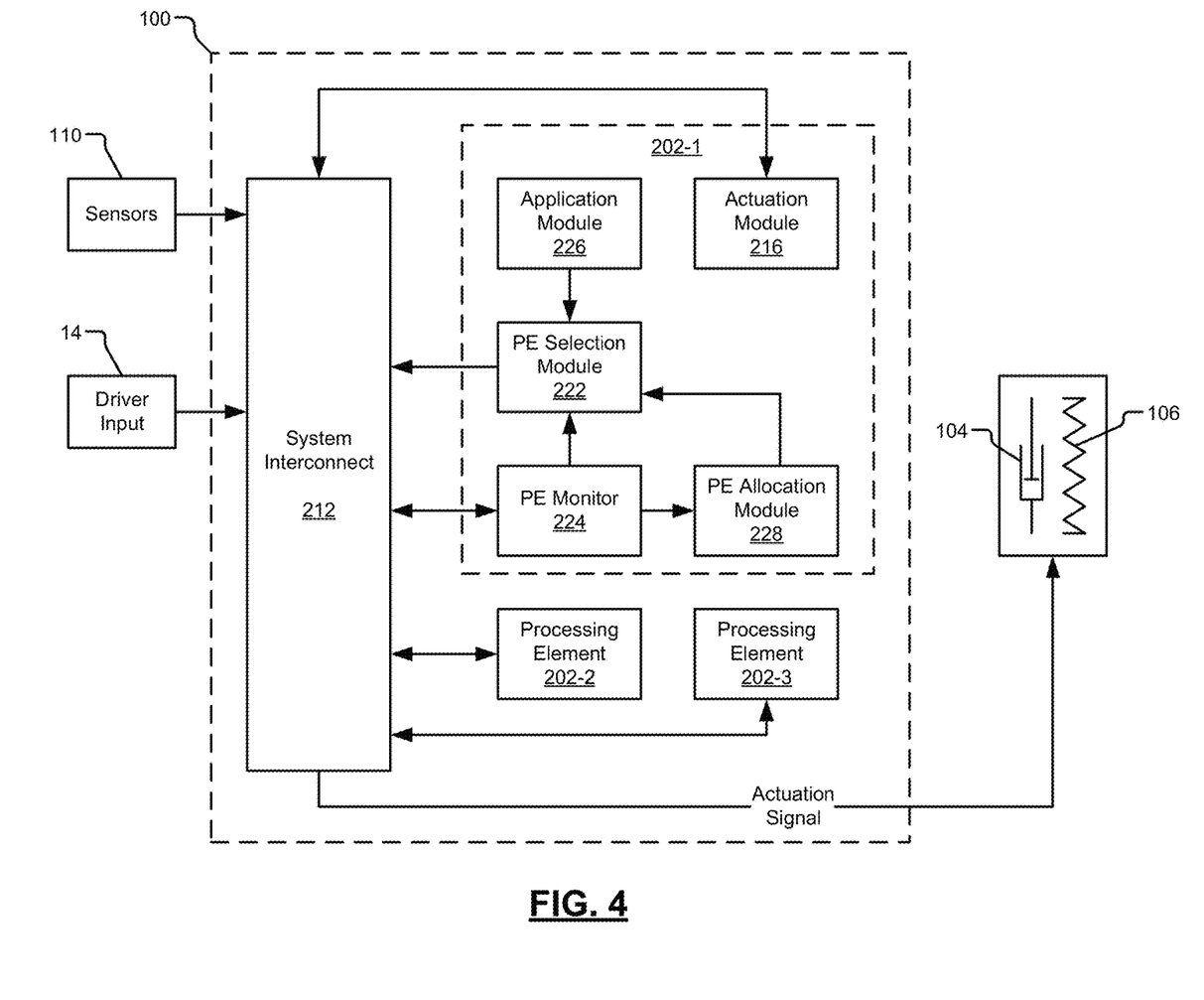
FIG. 4 is a block diagram of system of suspension modifiers, in accordance with an embodiment.

Referring now to FIG. 4, the system 100 may include the plurality of suspension modifiers 102-1, 102-2, and 102-3, each including respectively processing elements 202-1, 202-2, and 202-3 (collectively processing elements 202) linked by the system interconnect 212 as shown in FIG. 2. A first processing element 202-1 of the plurality of processing elements 202 includes a processing element (PE) selection module 222 that selects which of the processing elements 202 to utilize for determining the actuation signal for the damper 104 and/or spring 106. The processing element 202-1 may include a PE monitor 224 which monitors at least one characteristic of the processing elements 202. The processing element 202-1 may include an application module 226 which monitors which of a plurality of applications is active for generating the actuation signal. For example, the application module 226 may selecting an application based on the vehicle state as determined by the state determination module 218. Any or none of the additional processing elements 202, such as second processing element 202-2 and third processing element 202-3 may include any or none of the PE selection module 222, the PE monitor 224, and the application module 226.

The PE selection module 222 may select the best available processing element for computing the actuation signal based on at least one of a processor characteristic and an application characteristic. In one embodiment, the PE selection module 222 selects the first processing element 202-1 in order to achieve the shortest processing time from sensor input to actuation signal generation.

The at least one processor characteristic is selected from a plurality of characteristics such as, but not limited to, a processor architecture, a clock rate, a processor load, or the like. The at least one application characteristic is selected from a number of characteristics such as, but not limited to, a graphics processing unit (GPU), acoustic processing unit, a faster cache characteristic, a memory characteristic, a storage characteristic, or the like. Further, the application characteristic may be based on executional space that is best tailored to the specific application. E.g., video-intensive processing running on a processing element with a GPU, etc.

In one embodiment, the processing element (PE) monitor 224 is used to monitor the plurality of processing elements 202 and determine a processor load or other characteristic of each processing element. The PE selection module 222 may select the processing element based on the processor load, temperature, status, or other characteristic.

In one embodiment, a PE allocation module 228 designates an execution space of the processing element 202 from one or more of the processing element(s). For example, the processing allocation module 228 may designate a portion of a field programmable gate array (FPGA) to be the location where the execution will occur.

Figure 5:
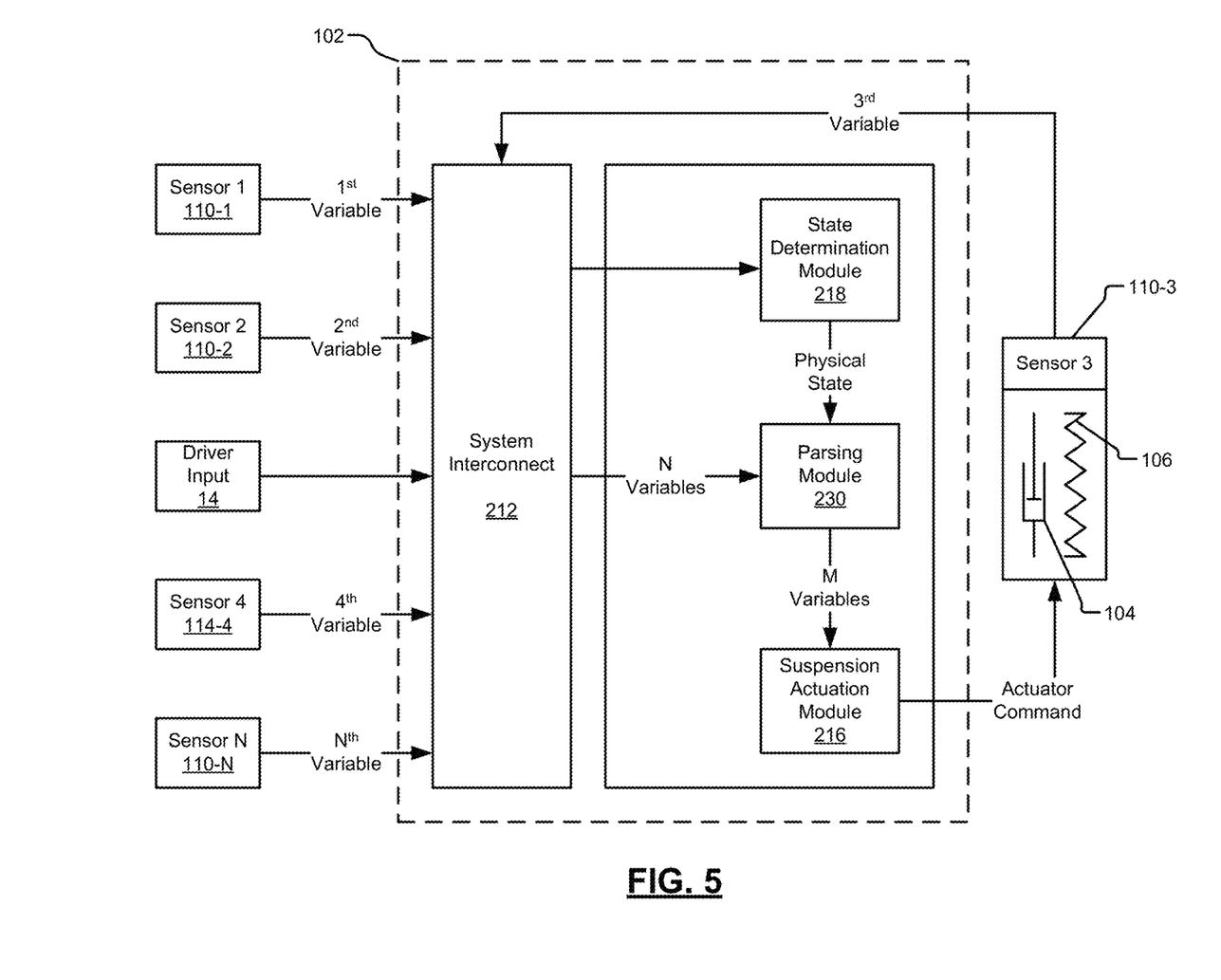
FIG. 5 is a block diagram of a suspension modifier, in accordance with an embodiment.

Referring now to FIG. 5, the suspension modifier 102 may include a parsing module 230 which may receive N variables from the sensors 110 and driver inputs 14 via system interconnect 212. The parsing module 230 may reduce the number of variables provided to the suspension actuation module 216 to generate a control signal for the damper 104 and/or spring 106. The parsing module 230 may determine a subset M variables of the N variables based on the physical state of the vehicle 10 as determined by the state determination module 218.

For example, the state determination module 218 may determine that the vehicle 10 is traveling down a known path, perhaps previously traversed on a similar day and at a similar speed. The state determination module 218 may reduce the number of variable to be used for determining actuation signals in order to increase processing capabilities for unexpected events, such as, a pothole, road obstruction, animal in the path, or other event that may require an evasive maneuver by the suspension components 104 and 106. In some situations, the parsing module 230 may reduce the input to a single variable provided over a shunted data path. In other situations, the parsing module 230 may reduce the inputs to a value from a predetermined look-up value generated by a suspension modifier calibration activity prior to a drive. The predetermined look-up values may be downloaded to the system 100 and provided to the suspension modifiers 102. For example, for a given predetermined path or course to be driven by the vehicle 10, a plurality of tables and values could be provided to the system 100 to enable suspension actuation based primarily upon a GPS location with on-the-fly adjustment for corner-specific events.

Referring now to FIG. 6, a block diagram 300 of a plurality of communicatively coupled suspension modifiers 102 are shown in accordance with an embodiment. in one embodiment, the suspension modifiers 102a-102d each receive platform data 305 and each obtain and share their own corner data 306a-306d.

Although in diagram 300, four suspension modifiers 102a-102d are shown, the technology is well suited to using more or fewer suspension modifiers. For example, a six wheeled vehicle could have 2, 4, 6, 7, etc. suspension modifiers, a tracked vehicle could have 2 suspension modifiers, a two wheeled vehicle could have 2 suspension modifiers, a vehicle with four wheels could have only 2 suspension modifiers, e.g., one for the front suspension and one for the back, etc. Thus, embodiments are well suited to the use of any number of suspension modifiers greater than or equal to 2 to be used on a vehicle.

Figure 7:
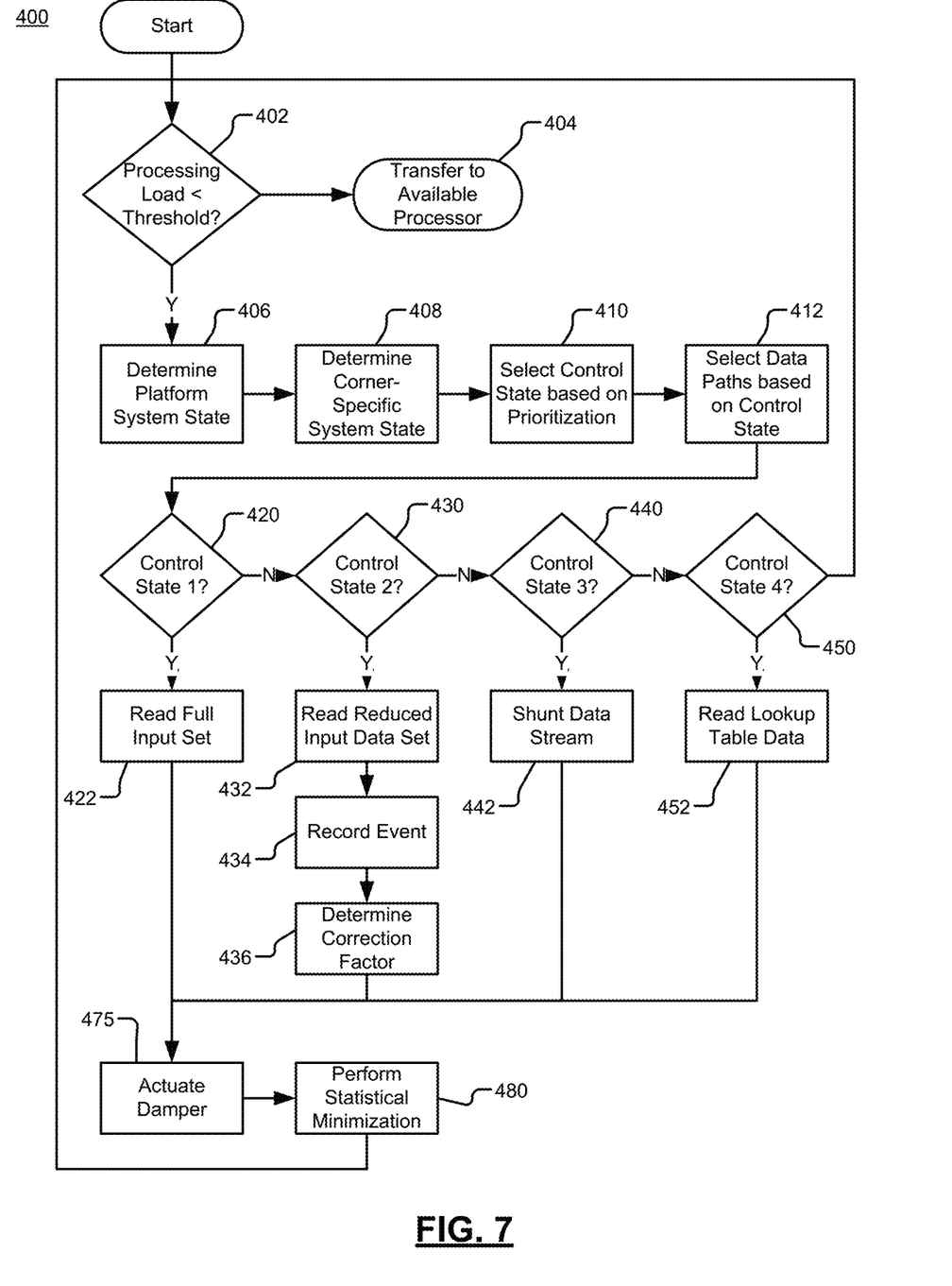
FIG. 7 is a flow chart of a system for controlling suspension of a vehicle, in accordance with an embodiment.

With reference now to FIG. 7, a flow chart 400 of a system for controlling suspension of a vehicle is shown in accordance with an embodiment. In one embodiment, the system minimizes data transmission latency between a sensor and a suspension controller of a vehicle. In one embodiment, the system selects processing elements and processing support elements for controlling a suspension actuator of a vehicle. In one embodiment, the system includes at least one suspension actuator for controlling motion of an unsprung mass relative to a chassis of the vehicle.

As the system operates, a processing load threshold 402 is monitored. In one embodiment, the processing load threshold 402 includes data path configurator 210 which acts similar to a network manager, and a processor performance monitor would serve as a processing load leveler. For example, data path configurator 210 of the suspension controller (e.g., ECU 118) selects a first data path of the plurality of data paths based on at least one characteristic of the first data path and the physical state and configures the first data path to transmit the first signal. Moreover, data path configurator 210 of the suspension controller (e.g., ECU 118) selects a second (an $n^{th}$, etc.) data path of the plurality of data paths based on the at least one characteristic of the first, second, $n^{th}$ data paths and the physical state and configures the first data path to transmit the first signal, the second data path to transmit the second signal, and the $n^{th}$ data path to transmit the $n^{th}$ signal.

For example, at 404 the backplane has a given amount of capacity and the data path configurator would reserve space for higher data rates. Similar to a network switch that reserves bandwidth for video teleconference, the data path configurator 210 may reserve backplane capacity for higher data volume sensors, such as for example, optical sensors, high resolution video sensors, etc.

Moreover, at 404, the processor performance monitor would determine which processors are busy and which are not, and assign work as appropriate.

At 406, a determination of the platform system state is performed. In one embodiment, a state determination module determines the physical state of the vehicle. In general, state determination module could be ECU 118 which receives input from one or more suspension modifiers 102; sensors 110 for both platform and corner vehicle level inputs; controllable and actuatable suspension components 104, 106; peer-to-peer interconnects 116 between the suspension modifiers 102.

In one embodiment, state determination module 218 (e.g., part of suspension modifier 102 or ECU 118) would analyze the inputs received from one or more of the above stated components and utilize the inputs to determine a physical state of the vehicle. Examples of a vehicle's physical state includes, but are not limited to, steady state, zero g, negative g, anticipatory state, non-level vehicle, and the like.

At 408, a determination of the corner specific physical state is also performed. In general, the state determination module (e.g., ECU 118) would analyze the state of the corner specific system and determine control modes based on the physical state. Examples of corner specific physical states include, but are not limited to high g-force turn, dive, squat, pothole, obstacle, zero g, non-level wheel, anticipatory wheel state, and the like.

In one embodiment, the determination of the physical state of the vehicle also includes the detection of an improvement or degradation in ride or stability of the vehicle. For example, temperature of fluid (one vs. all) could indicate either a failed single shock or completely overworked suspension. An airborne state (and in what order it happened) could be used to pre-stage suspension to react when the vehicle lands. A control panel output could also draw on the state determination with indicators (total stress from start or virtual cycle indicator), temperatures, and other shock absorber data relevant to the operator of the vehicle, and the like. In one embodiment, the information about the improvement or degradation in ride or stability is provided to the suspension modifier 102.

At 410, one embodiment selects the control state based on prioritization. For example, in one embodiment, each suspension modifier 102a-102d, utilizes an exemplary system prioritization hierarchy. E.g., in one embodiment, the hierarchy includes a system level, a high g corner event, a customary corner event, and an off-board anticipatory event (both platform and corner), and the like.

For example, a corner off-board anticipatory event is something like, when moving forward a rear suspension will likely experience what the front suspension experienced. In contrast, in a platform off-board event, a vehicle in front will experience an event and transmit the data about the event to be used by the trailing vehicle.

At 412, and broken down in the description of 420-450 herein, the data path is selected based on the control state. Although 4 control states are discussed, the technology is well suited to a different number of control states, a hybridization of two or more of the discussed control states, or the like.

At 420, in a first slowest state, e.g., control state 1, all sensed data is used. That is, as shown in 422, the full input set is read and utilized. An example of control state 1 would be a normal drive down a standard street. During the drive, the road surface is mostly uniform and the driver inputs are normal driving turns, starts and stops. The suspension information is not really changing and the suspension can be set for a smooth ride.

At 475, the suspension modification would then be provided, to at least one of the plurality of suspension components to modify the performance of at least one of the plurality of suspension components.

At 430, in a second faster state, e.g., control state 2, less data is used based on statistical analysis to determine the most relevant data needed to actuate the damper. An example of control state 2 would be a normal drive down a snow covered street. During the drive, the road surface condition is changing in traction and consistency; and the driver inputs are a harder braking, sliding of one or more wheels, a hard turn, a skid, or the like. The suspension information is changing frequently and adjustments are continually being made. Thus, the vehicle does not need to be constantly in control state 2, but would vary between the different control states as conditions change.

At 432, the reduced input data set would be utilized. For example, in one embodiment a data minimizer would also look at all sensor inputs and actuator signals and determine if actuation variance can be explained with a smaller data set. If so, the minimizer could act to "prune" sensor data from the calculations to achieve actuation signals that are 85%-95% of what would be seen if more or all data were used to calculate a response. The discussion of the reduced data set is provided in further detail in the section entitled selection of minimized data set for % accurate control.

Further, at 434 the information about the event could be recorded and stored in the lookup table for later utilization. At 436, a correction factor or suspension modification would be developed and recorded in the lookup table for later application. For example, a sensor 110 may detect a bottom-out or top-out event by a position sensor which may provide feedback to the system 100 for improved response to a similar future event. The correction factor could relate to deterioration of a suspension component, such as for example a worn shock absorber with low gas pressure. Other suspension modifier 102 may also use the feedback to adjust damping or spring rates to compensate for the deteriorating suspension component.

At 475, the suspension modification would then be provided, to at least one of the plurality of suspension components to modify the performance of at least one of the plurality of suspension components.

At 440, in a third even faster state, e.g., control state 3, the most relevant data stream is shunted to the specific wheel. In one embodiment, the data can be drawn from a vehicle ahead. An example of control state 3 is a quick or surprising event that occurs during any of the other control states. During the drive, a significant deviation in the road surface condition is realized e.g., a large pothole or the like. The suspension information is not frequent and is not universal, and the adjustments to the suspension components need to be made based on the specific event. Thus, the information needs to reach the appropriate suspension and is likely not even applicable to the other wheels or suspension components in the system.

In one embodiment, data path configurator 210 uses data shunting to get the most useful data to the processing element by real-time operating system (RTOS) manager. Examples of data shunting, e.g., directing the data to the specific corner, include aspects such as, rear suspension needing to know accelerator position; front suspension needing to know brake position; right suspension needing to know left turn; left suspension needing to know right turn, etc.

For example, instead of providing the data throughout the system, when the vehicle is in a faster state, e.g., the suspension is encountering quick changes in surface, g-force, or the like, the most relevant data stream will be shunted to the suspension modifier associated with the specific wheel needing the suspension modification and the specific suspension modifier 102 will change focus to processing the relevant data from the data stream to develop the appropriate suspension modification as a highest priority. After the shunted data is resolved, the specific suspension modifier 102 will then return to normal processing operations.

At 475, the suspension modification would then be provided, to at least one of the plurality of suspension components to modify the performance of at least one of the plurality of suspension components.

At 450, in the fastest state, e.g., control state 4, data needed for control calculations is recovered from the lookup table. In one embodiment, the lookup table data is updated and/or corrected over time. In another aspect, software algorithms are co-located within storage mediums based upon co-occurrence.

For example, at 452, in the fastest state the suspension modifier would utilize the lookup table to obtain a suspension modification without having to develop the suspension modification. This will be valuable in saving time when the vehicle is moving quickly or encountering a number of different inputs in a very short period of time, such that the suspension modifiers 102 determine that the need for a suspension modification, or an ongoing consistent need for different suspension modifications, is required faster than the time required for the suspension modifiers 102 to analyze the input and develop the necessary suspension modification.

At 475, the suspension modification would then be provided, to at least one of the plurality of suspension components to modify the performance of at least one of the plurality of suspension components.

In one embodiment, at 480 the system also includes a statistical minimizer, or processor performance monitor, would serve as a processing load leveler. For example, the processor performance monitor would determine which processors are busy and which are not, and assign work as appropriate.

Selection of Minimized Data Set for % Accurate Control

In one embodiment a data minimizer would also look at all sensor inputs and actuator signals and determine if actuation variance can be explained with a smaller data set. If so, the minimizer could act to "prune" sensor data from the calculations to achieve actuation signals that are 85%-95% of what would be seen if more or all data were used to calculate a response.

In one embodiment, the plurality of sensors 110 that measure N variables related to control of the at least one suspension actuator and that transmit the N variables by a plurality of signals over a communication network. As described herein, the N variables include aspects such as, but not limited to, a damper position, a vehicle speed, a steering angle, a throttle position, a damper temperature, a damper pressure, a damper acoustic signal, a barometric pressure, and an ambient temperature.

The state determination module measures an instantaneous state of the vehicle.

The parsing module selects a subset M variables of the N variables necessary to generate valid actuator signals for the at least one of the actuatable suspension components 140 based on a mathematical reduction yielding a maximum variance explained for the instantaneous state.

The actuation module of suspension modifiers 102 generates the actuation signal to control the damping characteristic of the suspension actuator based on the subset M variables.

For example, N variables that are relevant to controlling the damper are available to be used to determine the damping force needed to respond to events while the vehicle is in a given instantaneous state. In the present example, it is assumed that there are 25 variables such as, damper position, vehicle speed, steering angle, throttle position, damper temperature, damper pressure, damper acoustic signal, barometric pressure, ambient temperature . . . and so on.

Moreover, there are instantaneous states for the vehicle like steady state which involves aspects such as, but not limited to, throttle and steering; a diving state that involves aspects such as, but not limited to, brakes and vehicle speed; a roll state that involves aspects such as, but not limited to, steering and vehicle speed; and a jump state and a landing state that involves aspects such as, but not limited to, damper position, speed, and acceleration.

Depending on the instantaneous state, the time in which a calculation may be performed may vary. For example, in some instantaneous states, like a steady stead, there is enough calculation time to use all 25 variables in generating the solution that is passed to the actuation module. But when another instantaneous state is detected, the calculation time may be reduced. In those situations, where the calculation time is reduced, one embodiment finds a subset of the 25 variables that will provide a sufficient response to the events that will occur due to the change of the instantaneous state.

In one embodiment, the subset of the variables is based on the minimum number needed until variation on the damping force signal becomes asymptotic and greater than a % variance explained minimum. In other words, there is a window between a perfect signal that uses all 25 variables and a % variance explained threshold (e.g., 80%, 90%, etc.). As more variables are added to the calculation, the % variance explained approaches 100%. However, at some point, the % variance explained is "good enough" given the circumstances and the reduced calculation time.

One embodiment keeps adding variables to the calculation as long as there is time to use them before the suspension modifiers 102 need to modify the actuatable suspension components 104, 106. In one embodiment, that time is situation dependent or dependent upon the vehicle's instantaneous state or a state change. For example, by looking at the vehicle instantaneous state, determine if there is a change, then choosing which variables to use based on the change in state and its associated calculation time limitations. In one embodiment, the number and type of variables that are used for each instantaneous state may additionally be determined through calibration of the vehicle suspension.

Example Computer System

With reference now to FIG. 5, a block diagram of an example computer system with which or upon which various embodiments of the present invention are implemented is shown. It should be appreciated that one or more of the embodiments are composed of computer-readable and computer-executable instructions that reside, for example, in a non-transitory computer-readable medium.

Although FIG. 5 illustrates an example computer system 500 used in accordance with embodiments of the present technology. It is appreciated that system 500 of FIG. 5 can operate on or within a number of different computer systems including general purpose networked computer systems, computer-readable and computer-executable instructions that reside, for example, in non-transitory computer-readable medium, embedded computer systems, routers, switches, server devices, user devices, various intermediate devices/artifacts, stand-alone computer systems, mobile phones, personal data assistants, televisions and the like.

Figure 8:
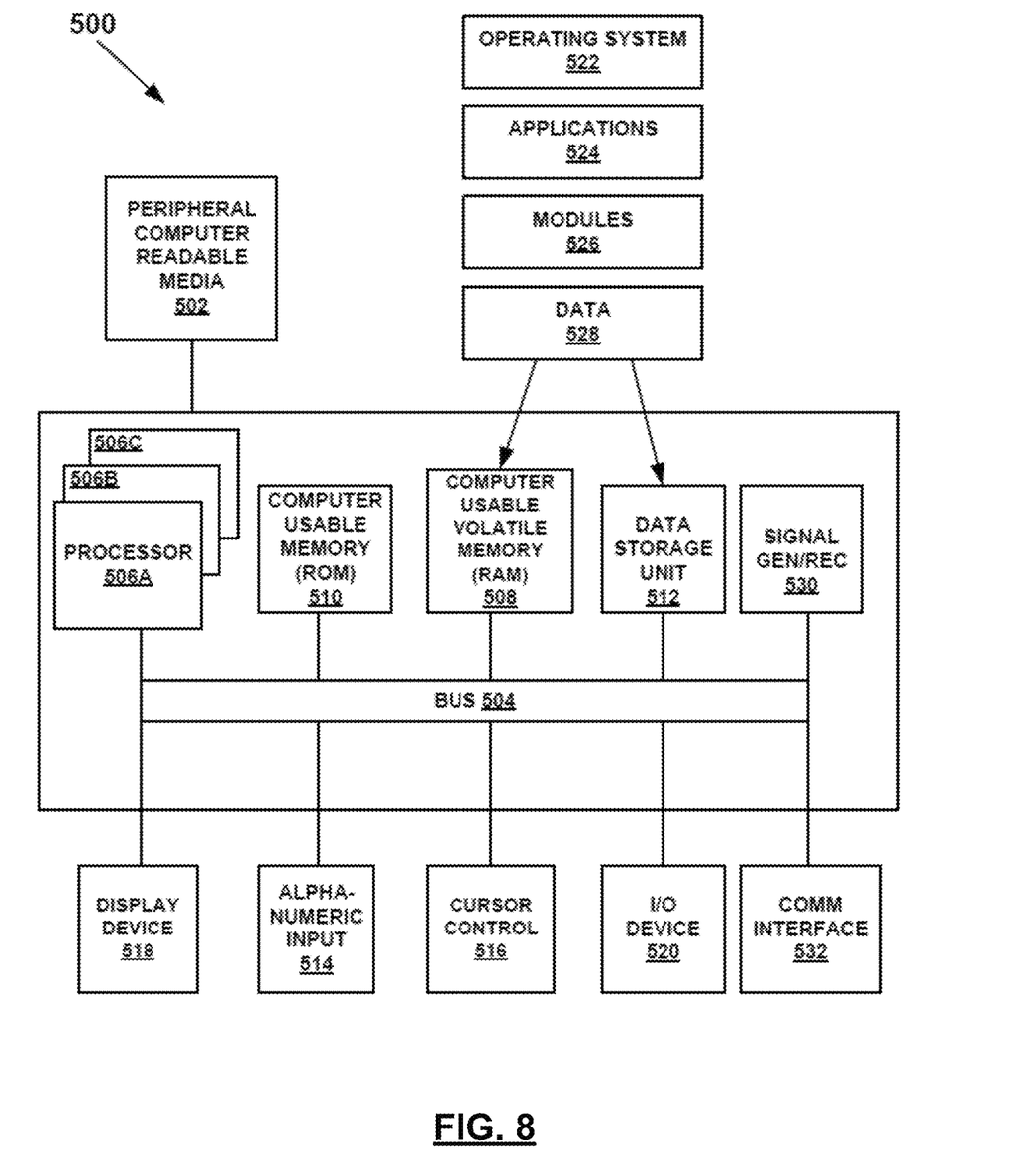
FIG. 8 is a block diagram of an example computer system, in accordance with an embodiment.

Computer system 500 of FIG. 8 is well adapted to having peripheral computer readable media 502 such as, for example, an external storage drive, a compact disc, a flash drive, a thumb drive, a wireless radio enabled device, and the like coupled thereto.

Computer system 500 of FIG. 8 includes an address/data/control bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C are any of various types of microprocessors. Computer system 500 also includes data storage features such as a computer usable volatile memory 508, e.g., random access memory (RAM), coupled to bus 504 for storing information and instructions for processors 506A, 506B, and 506C.

System 500 also includes computer usable non-volatile memory 510, e.g., read only memory (ROM), coupled to bus 504 for storing static information and instructions for processors 506A, 506B, and 506C. Also present in system 500 is a data storage unit 512 (e.g., a magnetic disk drive, optical disk drive, solid state drive (SSD), and the like) coupled to bus 504 for storing information and instructions. Computer system 500 also includes an optional alpha-numeric input device 514 including alphanumeric and function keys coupled to bus 504 for communicating information and command selections to processor 506A or processors 506A, 506B, and 506C. Computer system 500 also includes an optional cursor control device 516 coupled to bus 504 for communicating user input information and command selections to processor 506A or processors 506A, 506B, and 506C. Optional cursor control device is a touch sensor, gesture recognition device, and the like. Computer system 500 of the present embodiment also includes an optional display device 518 coupled to bus 504 for displaying information.

Referring still to FIG. 5, optional display device 518 of FIG. 5 is a liquid crystal device, cathode ray tube, OLED, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

Computer system 500 also includes an I/O device 520 for coupling system 500 with external entities. For example, in one embodiment, I/O device 520 is a modem for enabling wired or wireless communications between system 500 and an external network such as, but not limited to, the Internet or intranet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 would be stored in other locations such as on a network or on a flash drive; and that further, operating system 522 would be accessed from a remote location via, for example, a coupling to the internet. In one embodiment, the present technology, for example, is stored as an application 524 or module 526 in memory locations within RAM 508 and memory areas within data storage unit 512. The present technology would be applied to one or more elements of described system 500.

System 500 also includes one or more signal generating and receiving device(s) 530 coupled with bus 504 for enabling system 500 to interface with other electronic devices and computer systems. Signal generating and receiving device(s) 530 of the present embodiment would include wired serial adaptors, modems, and network adaptors, wireless modems, and wireless network adaptors, and other such communication technology. The signal generating and receiving device(s) 530 would work in conjunction with one or more communication interface(s) 532 for coupling information to and/or from system 500. Communication interface 532 would include a serial port, parallel port, Universal Serial Bus (USB), Ethernet port, Bluetooth, thunderbolt, near field communications port, WiFi, Cellular modem, or other input/output interface. Communication interface 532 would physically, electrically, optically, or wirelessly (e.g., via radio frequency) couple system 500 with another device, such as a mobile telephone, radio, or computer system.

The computing system 500 is only one example of a suitable computing environment and is not intended to suggest any limitation as to the scope of use or functionality of the present technology. Neither should the computing environment be interpreted as having any dependency or requirement relating to any one or combination of components illustrated in the example computing system 500.

The present technology is described in the general context of computer-executable instructions, such as program modules, being executed by a computer. Generally, program modules include routines, programs, objects, components, data structures, etc., that perform particular tasks or implement particular abstract data types. The present technology can also be practiced in distributed computing environments where tasks are performed by remote processing devices that are linked through a communications network. In a distributed computing environment, program modules are located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A system for selection of processing elements and processing support elements for controlling a suspension actuator of a vehicle including a plurality of processing elements, comprising:
    a sensor that measures a variable related to controlling motion of an unsprung mass relative to a chassis and transmits a signal corresponding to the variable over a communication network that links the plurality of processing elements;
    a processing element selection module that selects a first processing element from the plurality of processing elements for generation of an actuator signal based on at least one of a processor characteristic and an application characteristic, wherein said processing element module selects said first processing element based upon a feature selected from the group consisting of: processor load, processor temperature and processor status, and wherein said processor characteristic is selected from the group consisting of: processor architecture, processor clock rate and processor load; and
    an actuation module of the first processing element that generates the actuation signal to control a damping characteristic of the suspension actuator and sends the actuation signal to the suspension actuator.

2. The system of claim 1, further comprising a load monitoring module that monitors the plurality of processing elements and determines the processor load on each processing element.

3. The system of claim 1, wherein the application characteristic comprises one of a graphics processing unit (GPU) and an acoustic processing unit.

4. The system of claim 1, further comprising a processing allocation module that designates a processor element execution space from the first processing element.

5. A system for controlling suspension of a vehicle including at least one suspension actuator for controlling motion of an unsprung mass relative to a chassis of the vehicle, comprising:
    a plurality of sensors that measure N variables related to control of the at least one suspension actuator and that transmit the N variables by a plurality of signals over a communication network;
    a state determination module that measures an instantaneous state of the vehicle;
    a parsing module that selects a subset M variables of the N variables necessary to generate valid actuator signals for the at least one suspension actuator based on a mathematical reduction yielding a maximum variance explained for the instantaneous state;

an actuation module that generates an actuation signal to control a damping characteristic of the suspension actuator based on the subset M variables; and a processing element selection module that selects a first processing element from a plurality of processing elements for generation of said actuation signal based on at least one of a processor characteristic and an application characteristic, wherein said processing element module selects said first processing element based upon a feature selected from the group consisting of: processor load, processor temperature and processor status, and wherein said processor characteristic is selected from the group consisting of: processor architecture, processor clock rate and processor load.

6. The system of claim 5, wherein the N variables are related to control the damping of the at least one suspension actuator.

7. The system of claim 5, wherein the N variables are utilized by the state determination module to measure the instantaneous state of the vehicle and determine a damping force needed to respond to an event.

8. The system of claim 5, wherein the N variables are selected from the group consisting of: a damper position, a vehicle speed, a steering angle, a throttle position, a damper temperature, a damper pressure, a damper acoustic signal, a barometric pressure, and an ambient temperature.

9. The system of claim 5, wherein the instantaneous state comprises one of a steady state, a diving state, a rolling state, a jumping state, and a landing state.

10. The system of claim 5, wherein the parsing module that selects the subset M variables of the N variables necessary to generate valid actuator signals, continues adding M variables until a state change is detected.

* * * * *